United States Patent [19]

Yang

[11] Patent Number: 5,303,366
[45] Date of Patent: Apr. 12, 1994

[54] INTERFACE CARD FOR SCANNER

[76] Inventor: Tso S. Yang, 11th Fl., No. 11, Sec. 2, Nanking E. Rd., Taipei, Taiwan

[21] Appl. No.: 767,411

[22] Filed: Sep. 30, 1991

[51] Int. Cl.[5] .......................................... G06F 15/64
[52] U.S. Cl. ............................ 395/500; 364/DIG. 2; 364/920.7
[58] Field of Search ............... 364/DIG. 1 MS File, 364/DIG. 2 MS File; 395/200, 250, 275, 100, 550, 500, 800; 235/472, 455, 467, 462; 250/234, 566; 358/473

[56] References Cited

U.S. PATENT DOCUMENTS

| | | | |
|---|---|---|---|
| 4,760,467 | 7/1988 | Marazz et al. | 358/303 |
| 5,034,967 | 8/1991 | Cox et al. | 375/119 |

Primary Examiner—Robert B. Harrell
Attorney, Agent, or Firm—Ryan, Kees & Hohenfeldt

[57] ABSTRACT

An interface card communicates a scanner with a MACINTOSH computer. The scanner previously sends status value and 8-byte redundant data to the interface card before transmitting the image data. The 8-byte redundant data is not acceptable to the MACINTOSH computer and is converted into irregular image on the screen. In addition to a CPU, a memory, an address decoder, a counter and status registers, a S-to-P converter and an image data receiver, the interface card also has a circuit which consists of four AND gates, four flip-flops and a counter. The scanner sends a step trigger signal *ST and a synchronous signal *AR before sending data to the interface card. Therefore, the circuit processes the *ST and *AR signals and counts the clock pulses for transmitting redundant data so as to delete these data from the interface card.

1 Claim, 2 Drawing Sheets

INTERFACE CARD FOR SCANNER

BACKGROUND OF THE INVENTION

The present invention relates to an interface card which connects a scanner with a MACINTOSH computer. More particularly, the present invention relates to an interface card which pre-processes the data from the scanner so as to ensure that all of the data are acceptable to the MACINTOSH computer.

As is well-known, a scanner communicates with a computer by an interface card in which the image data scanned by the scanner are stored in the memory of the interface card and sent to the computer in a manner of Direct Memory Access (DMA). Before the image data, the scanner previously sends a status value and eight-byte redundant data which follow the status value and are not acceptable to the MACINTOSH computer. The MACINTOSH computer reads all the data from the interface card and displays the data on the screen. However, the eight-byte redundant data are taken as the image data and converted into an irregular image on the screen.

The present invention aims to alleviate the above-mentioned disadvantages and to provide an interface card which pre-processes the data from the scanner so as to ensure that all of the data are acceptable to the computer.

SUMMARY OF THE INVENTION

A primary objective of the present invention is to provide an interface card for a scanner and a MACINTOSH computer in which data transmitted through the interface card are pre-processed so as to delete data which are non-acceptable to the computer.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
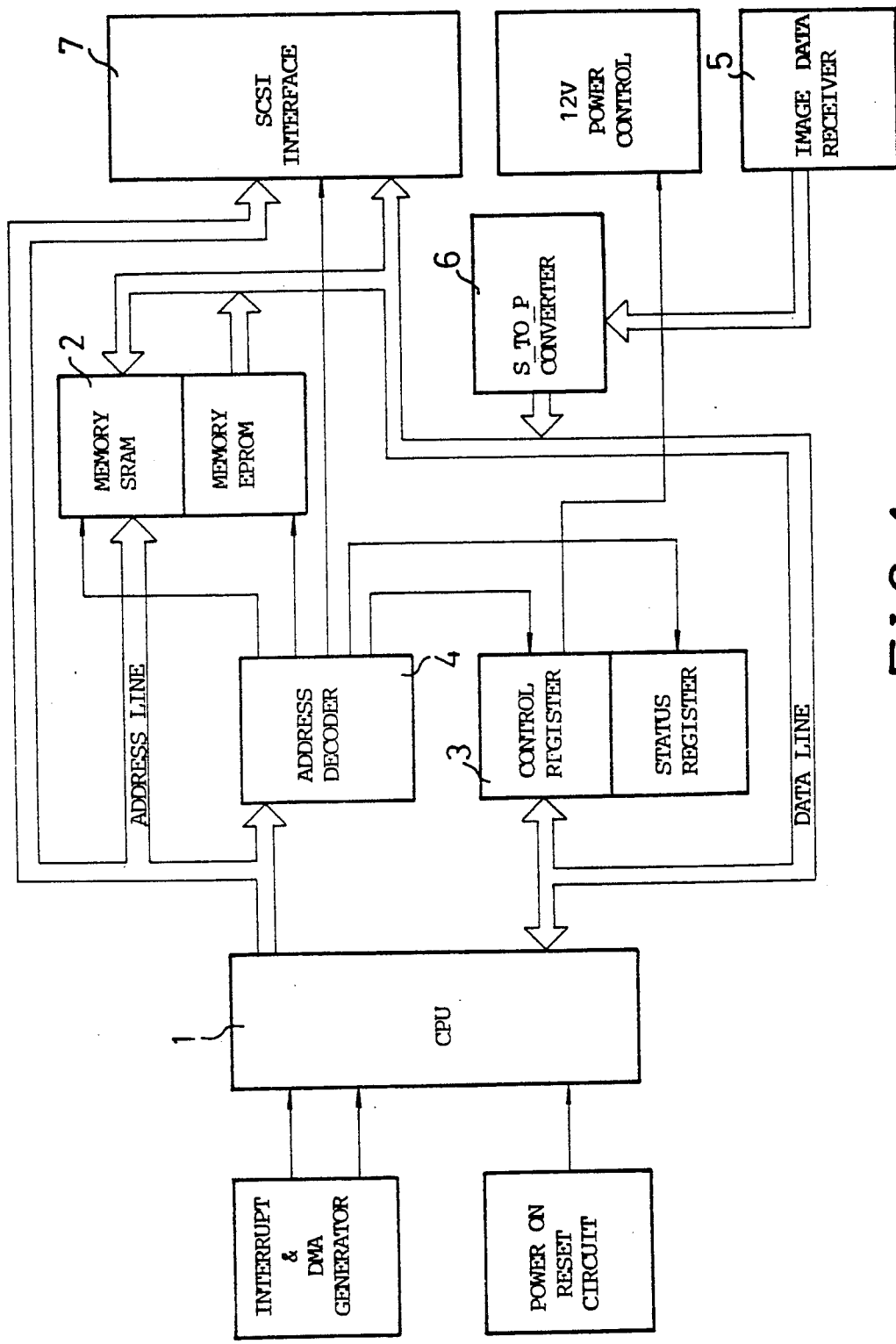
FIG. 1 is a functional block diagram of an interface card for a scanner in accordance with the present invention.

With reference to FIG. 1, it can be seen that an interface card for a scanner substantially comprises a central processing unit (CPU) 1, a memory 2, control and status registers 3, an address decoder 4, an image data receiver 5 for receiving data from the scanner, a serial to parallel (S-to-P) converter 6 for converting data from the image data receiver 5, and a small computer system interface (SCSI) 7.

When the CPU 1 executes programs stored in the memory, it continually checks whether or not any command has been sent from the SCSI 7. If the CPU 1 receives a scanning command, it actuates the scanner and reads a status value via the control and status registers 3, respectively. When the scanner begins to catch image data, all of the image data are temporarily stored in the memory through the S-to-P converter 6. A quantity of image data, up to a certain amount, are sent to the main board of a MACINTOSH computer via the SCSI 7 in a manner of direct memory access (DMA). Since the construction of the interface card is well-known in the art, further discussion and description are not necessary.

Figure 2:
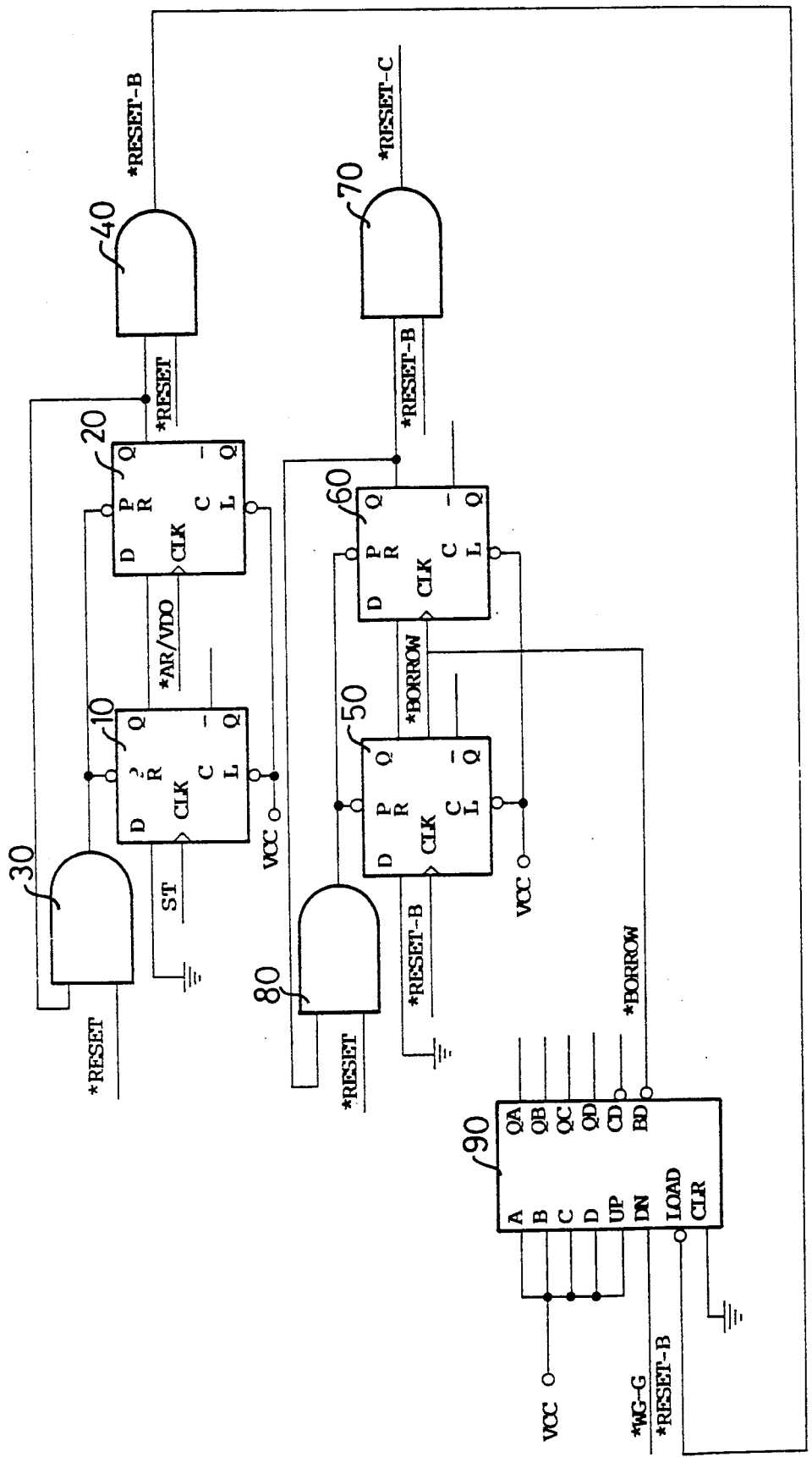
FIG. 2 is a circuit diagram within the interface card of FIG. 1 in which redundant data are deleted in accordance with the present invention.

Particularly referring to FIG. 2, a circuit diagram of a preferred embodiment of the present invention comprises four AND gates 30, 40, 70 and 80, four flip-flops 10, 20, 50 and 60 and a base-twelve counter 90 for deleting the redundant data from the interface card. Clock pulses *WG-G of the counter 90 are produced by the scanner and are sent to a DN pin (for down-counting) of the counter 90 under the control of the CPU 1, so that the the counter 90 functions as a devided-by-16 down counter. Therefore the scanner and the interface card are synchronous by means of the clock pulses *WG-G.

The positive output of the first flip-flop 10 is coupled to the D-input of the second flip-flop 20, the positive output of which is connected to an input of the first and second AND gates 30, 40. The output of the first AND gate 30 is fed back to the preset-input of the first and second flip-flops 10, 20. The output of the second AND gate 40 is connected to the clock-input of the third flip-flop 50 and the load-input of the counter 90.

The positive output of the third flip-flop 50 is connected to the D-input of the fourth flip-flop 60, the positive output of which is connected to the input of the third and fourth AND gates 70, 80. The output of the fourth AND gate 80 is fed back to the preset-input of the third and fourth flip-flops 50, 60.

As mentioned heretofore, the scanner sequentially sends status data, 8-byte redundant data and image data to the interface card. It should be noted that the scanner sends one byte of data during two clock pulses, so that it takes sixteen clock pulses for the scanner to send the 8-byte redundant data.

Before scanning, the scanner sends a step-trigger signal ST to the clock-input of the first flip-flop 10. Then, a synchronous signal *AR from the scanner for controlling the sending of format signals, such as density signal (dots per inch) and mode signal (monochrome mode or gray scale mode) from the scanner, is sent to the clock-input of the second flip-flop 20. Simultaneously, the status value of the scanner is stored in the memory 2 for the MACINTOSH computer to identify. A *RESET_B signal is sent from the second AND gate 40 after the ST and *AR signals are processed by the first and second flip-flops 10, 20 and the first and second AND gates 30, 40. The *RESET_B signal is respectively sent to the clock input of the third flip-flop 50 and the load-input of the counter 90. The counter 90 sends a *BORROW signal to the clock-input of the fourth flip-flop 60 after sixteen clock pulses are created. A *RESET_C signal is sent from the output of the fourth AND gate 70 in order to delete the 8-byte redundant data received by the interface card, after the *RESET_B and *BORROW signals are processed by the third and fourth flip-flops 50, 60 and the third and fourth AND gates 70, 80.

After the redundant data are cleared, the image data from the scanner are stored in the memory 2 and sent to the computer together with the status value while all the image data are received by the interface card.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. An interface card for a scanner comprising:

a central processing unit, memory means connected to the central processing unit for storing data, control register means connected to the central processing unit for storing control data, status register means connected to the central processing unit for storing status information, address decoder means for decoding address values from the central processing unit, image data receiver means connected to the central processing unit for obtaining image data, and serial-to-parallel converter means connected to the image data receiver means for converting serial data into parallel data used by the central processing unit, means for deleting redundant data from the scanner including a first AND gate, a second AND gate, a third AND gate, and a fourth AND gate, a first flip-flop, a second flip-flop, a third flip-flop, and a fourth flip-flop, a counter, means for connecting an output of the first AND gate to a D-input of the second flip-flop, means for connecting a positive output of the second flip-flop to an input of the first AND gate and to an input of the second AND gate, means for connecting an output of the first AND gate to a preset input of the first flop-flop and to a preset input of the second flip-flop, means for connecting an output of the second AND gate to a clock-input of the third flip-flop and a load input of the counter;

means for connecting a positive output of the third flip-flop to a D-input of the fourth flip-flop;

means for connecting a positive output of the fourth flip-flop to an input of the third AND gate and the fourth AND gate; and means for connecting an output of the fourth AND gate to a preset input of the third flip-flop and a preset input of the fourth flip-flop.

* * * * *